United States Patent
Kügler

[11] Patent Number: 5,405,061
[45] Date of Patent: Apr. 11, 1995

[54] ROTARY FEEDER FOR BULK MATERIAL OR LIQUIDS

[75] Inventor: Harald Kügler, Lindenfels, Germany

[73] Assignee: Waeschle Maschinenfabrik GmbH, Germany

[21] Appl. No.: 59,439

[22] Filed: May 4, 1993

[30] Foreign Application Priority Data

May 6, 1992 [DE] Germany .......... 42 14 441.8

[51] Int. Cl.6 .................. A01C 15/04; B67D 5/00; G01F 11/10
[52] U.S. Cl. .................. 222/362; 222/636
[58] Field of Search .......... 222/148, 344–353, 222/361–362, 365, 410, 636; 406/63–66

[56] References Cited

U.S. PATENT DOCUMENTS

| | | | |
|---|---|---|---|
| 612,242 | 10/1898 | Holt | 222/362 X |
| 1,767,009 | 6/1930 | Morin | 222/362 X |
| 1,879,109 | 9/1932 | Coy | 222/362 X |
| 2,064,719 | 12/1936 | Baldwin | 222/362 X |
| 2,655,291 | 10/1953 | Roundtree | 222/362 X |
| 2,778,542 | 1/1957 | Ries et al. | 222/362 X |
| 3,384,273 | 5/1968 | Benedetti et al. | 222/362 X |
| 4,131,394 | 12/1978 | Sjöblom | 222/362 X |
| 4,211,160 | 7/1980 | Bieser | 222/362 X |
| 4,331,268 | 5/1982 | Chisolm | 222/362 X |
| 4,955,509 | 9/1990 | Nevill | 222/362 X |

Primary Examiner—Andres Kashnikow
Assistant Examiner—Kenneth DeRosa
Attorney, Agent, or Firm—Henry M. Feiereisen

[57] ABSTRACT

A rotary feeder for bulk material or liquids includes a generally hollow cylindrical housing with a housing inlet and a radially opposing housing outlet. Rotatably supported in a sealing manner within the housing is a generally cylindrical rotor which includes at least one eccentric passageway extending in a radial plane between an inlet port and an outlet port and alternately connectable with the housing inlet and the housing outlet.

11 Claims, 2 Drawing Sheets

5,405,061

ROTARY FEEDER FOR BULK MATERIAL OR LIQUIDS

BACKGROUND OF THE INVENTION

The present invention refers to a rotary feeder for bulk material or liquids, and in particular to a rotary feeder of the type having a housing with at least one housing inlet for introduction of material and one housing outlet for discharge of material, with a rotor being sealingly and rotatably supported in the housing and including at least one passageway extending between an inlet port and an outlet port and alternately connectable with the housing inlet and the housing outlet.

A rotary feeder of this type is known from U.S. Pat. No. 5,094,403. The rotor which is rotatable about a vertical axis is of similar design as a revolver drum and thus contains numerous internal chambers or passageways extending axially from one end face to another. The rotor housing includes an upper flange plate, with a feed hopper being mounted thereto, and a lower flange plate which is connected to an outlet conduit. Through rotation of the rotor, the inlet ports of individual passageways communicate successively with an inlet in the upper flange plate for introduction of material. After being rotated by an angle of rotation of 180°, the passageways thus filled with bulk material arrive with their outlet ports at the housing outlet which is arranged suitably offset in the lower flange plate of the rotor housing.

German patent no. DE 35 42 487 describes a rotary feeder with a rotor which is also provided with axial passageways. In contrast to the previously described rotary feeder, the inlet and outlet ports of the passageways extend radially toward the circumference of the rotor and have different diameter at the inlet side and outlet side. Moreover, the rotor housing includes at the inlet side and at the outlet side an annular chamber with pertaining control bushing which includes circumferentially offset inlet and outlet ports via which in dependence on the rotation of the rotor the passageways are connected with either the annular chamber at the inlet side or the annular chamber at the outlet side.

SUMMARY OF THE INVENTION

It is an object of the present invention to provide an improved rotary feeder which is of a simple and compact design and yet suitable also for materials which are difficult to transport.

This object and others which will become apparent hereinafter are attained in accordance with the present invention by providing a housing of essentially hollow cylindrical shape with a housing inlet for introduction of material and a radially opposing housing outlet for discharge of material, with the housing enclosing an essentially cylindrical rotor which includes at least one eccentric passageway extending in a radial plane between an inlet port and an outlet port and being acted upon by a pivot drive so as to be rotatable between one end position in which the inlet port of the passageway communicates with the housing inlet and another opposite end position in which the outlet port of the passageway communicates with the housing outlet.

Preferably, the rotor includes two approximately parallel passageways. Through such a configuration the transport output of the rotary feeder can be almost doubled without complicating the overall structure and at the same time an improved, balanced mass distribution for the pivot drive of the rotor can be accomplished.

The passageways may be configured of any suitable cross section, e.g. cylindrical cross section, or a cross section which expands from the inlet port to the outlet port, e.g. in form of a truncated cone or a truncated pyramid.

Upon rotation from one end position to the other, the rotor occupies an intermediate position in which both the inlet port and the outlet port of the passageway are closed. This is advantageous especially when a pressure difference prevails between the inlet side and the outlet side of the rotary feeder.

Suitably, the housing of the rotary feeder may include at least one flush gas conduit by which the discharge of material and emptying of the passageway is improved. The flush gas conduit communicates with the inlet port of the passageway when the rotor occupies the one end position in which the outlet port of the passageway is connected with the housing outlet. Advantageously, the housing may also be provided with at least one vent conduit for pressure relief, and stripper blades at both sides of the housing inlet and the housing outlet for preventing build up of material accumulation about the circumference of the rotor.

A rotary feeder according to the present invention is characterized by a compact and light-weight design. Moreover, the simple structure of the rotary feeder allows easy maintenance and simple repair if such becomes necessary.

BRIEF DESCRIPTION OF THE DRAWING

The above and other objects, features and advantages of the present invention will now be described in more detail with reference to the accompanying drawing in which.

DETAILED DESCRIPTION OF PREFERRED EMBODIMENTS

Figure 1:
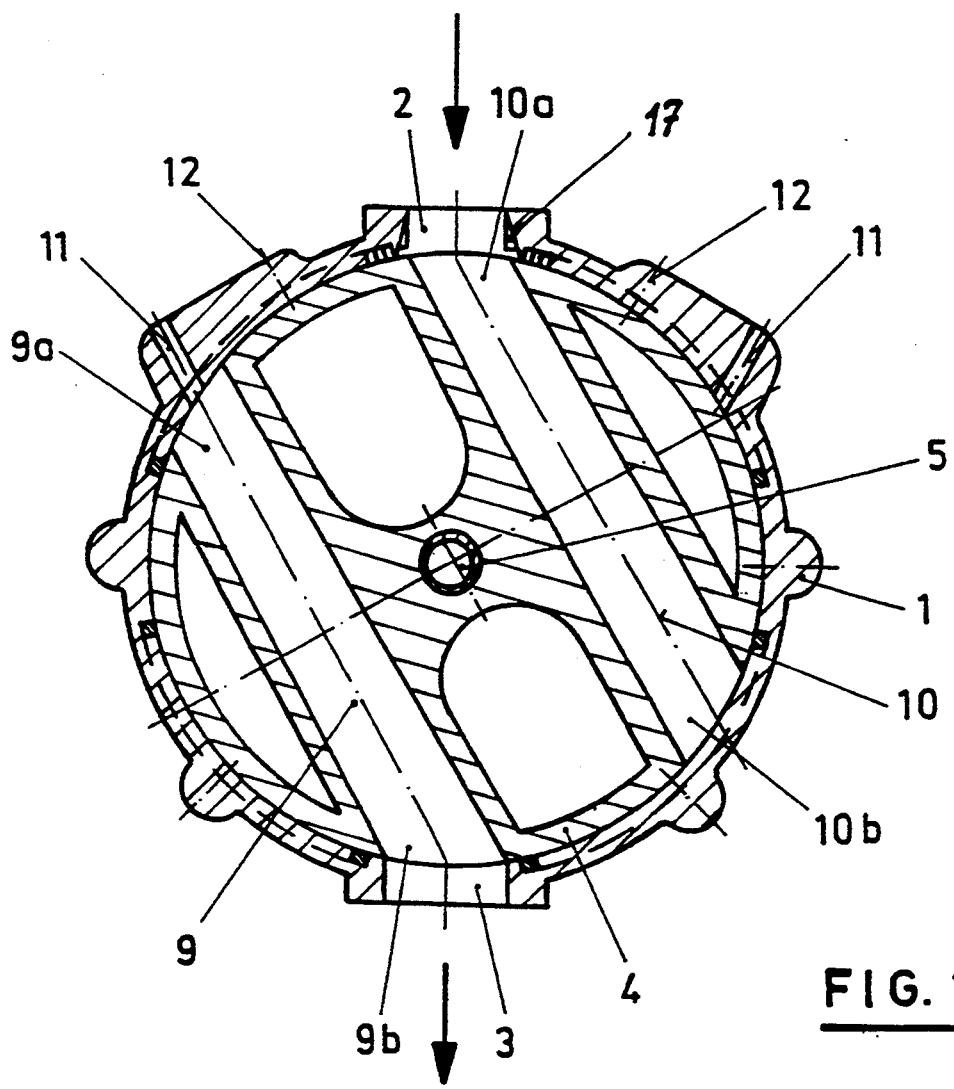
FIG. 1 is a vertical section of a rotary feeder in accordance with the present invention, illustrating the rotor in a first end position.

Throughout all the Figures, the same or corresponding elements are always indicated by the same reference numerals.

Figure 2:
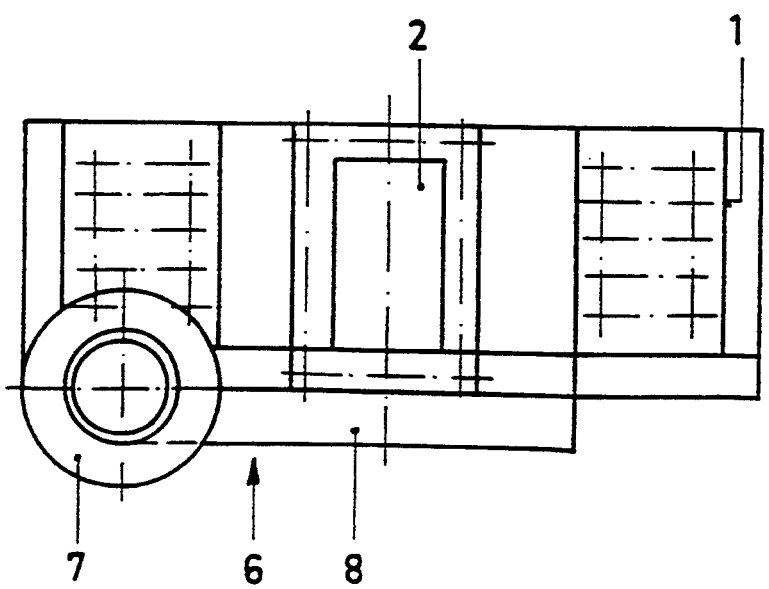
FIG. 2 is a plan view of the rotary feeder of FIG. 1.

Referring now to the drawing and in particular to FIG. 1, there is shown a vertical section of a rotary feeder in accordance with the present invention for feeding bulk material or liquids into a not shown container or reactor. The rotary feeder includes a generally cylindrical housing 1 with a top housing inlet 2 for introduction of material and a bottom housing outlet 3 for discharge of material. Sealingly fitted within the housing 1 and rotatably mounted on a horizontal shaft 5 is a generally cylindrical plug or rotor 4 which is provided with two approximately parallel and eccentric passageways 9; 10 extending in a radial plane between an inlet port 9a; 10a and an outlet port 9b; 10b. The rotor 4 is acted upon by a pivot drive, generally designated by reference numeral 6 and shown by way of example in particular in FIG. 2. The pivot drive 6 includes a pressure-operated lifting cylinder 7 and a swivel arm 8 which is connected on the one hand to the lifting cylinder 7 and on the other hand with the shaft 5 of the rotor 4. By means of the pivot drive 6, the rotor 4 is rotated back and forth or oscillated between two end positions, as respectively illustrated in FIGS. 1 and 4.

In the first end position as shown in FIG. 1, the housing inlet 2 communicates with the inlet port 10a of the passageway 10 which thus can be filled with material, while the outlet port 9b of the other passageway 9 communicates with the housing outlet 3 so that the passageway 9 can be emptied at the same time.

Figure 3:
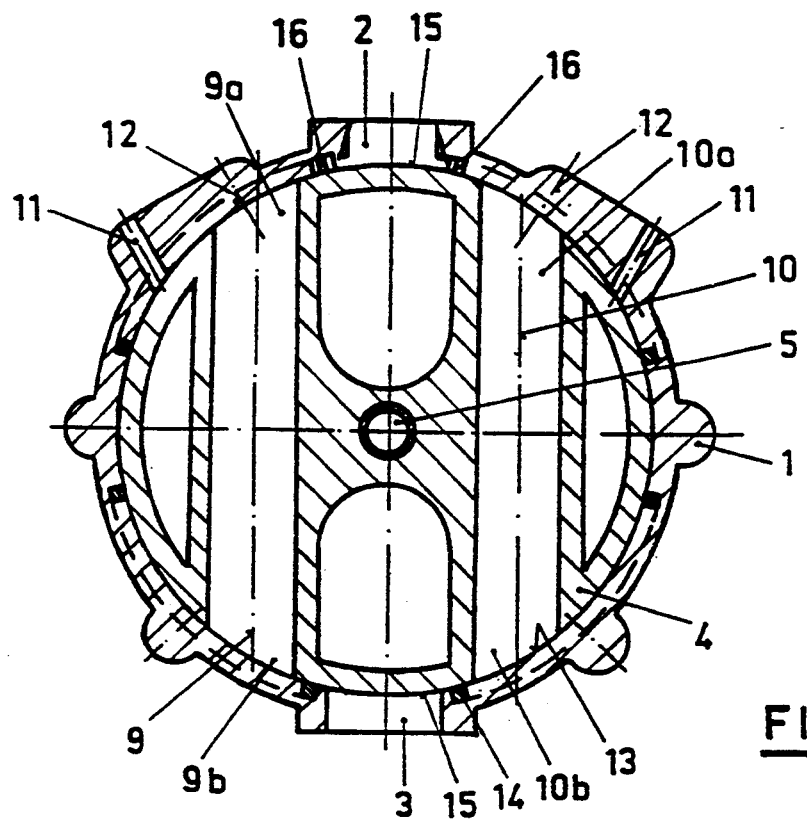
FIG. 3 is a vertical section of the rotary feeder of FIG. 1, illustrating the rotor in an intermediate position.
Figure 4:
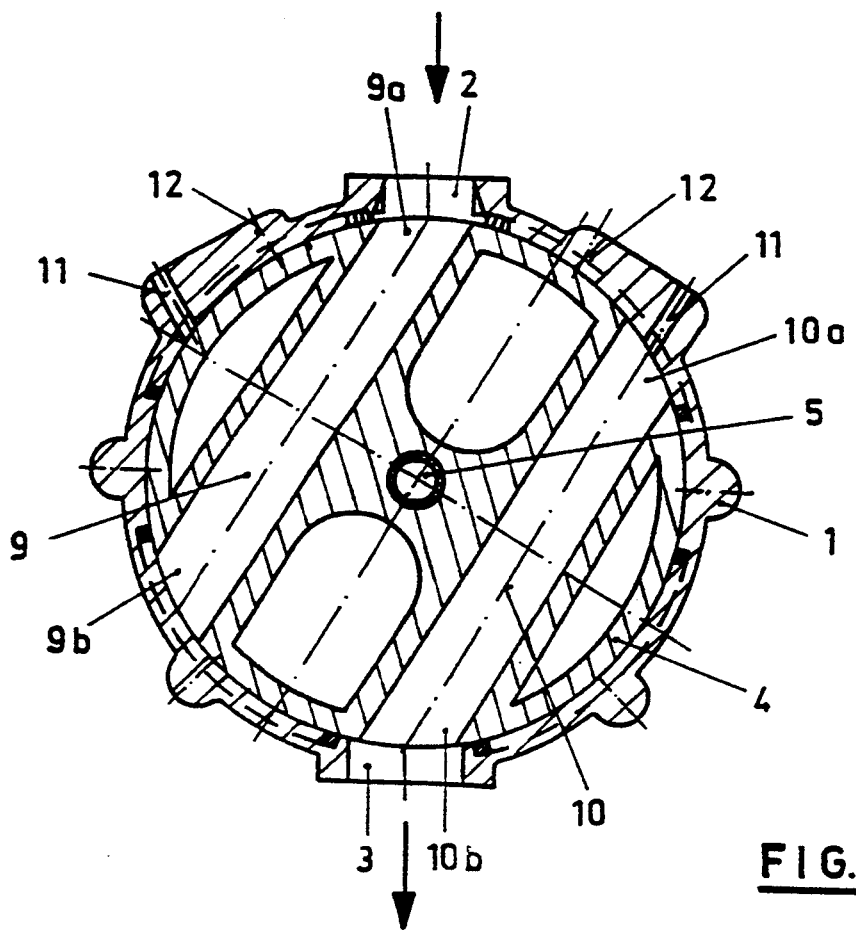
FIG. 4 is a vertical section of the rotary feeder of FIG. 1, illustrating the rotor in a second end position.

During the following rotation, the rotor 4 reaches an intermediate position, as shown in FIG. 3, in which the inlet ports 9a; 10a as well as the outlet ports 9b; 10b of both passageways 9; 10 are closed. A further rotation shifts the rotor 4 to the second end position, as shown in FIG. 4 in which the outlet port 10b of the passageway 10 now communicates with the housing outlet 3 for discharge of material contained in the passageway 10 through outlet 3 while the inlet port 9a of passageway 9 appears below the housing inlet 2 for enabling introduction of material. During return to the first end position, the rotor 4 reaches again the intermediate position shown in FIG. 3 before occupying the first end position shown in FIG. 1.

In the nonlimiting example of the rotary feeder shown in the drawings, both passageways 9, 10 are configured in form of a truncated cone or truncated pyramid, i.e. both passageways 9; 10 are flared outwards in direction from the inlet port 9a; 10a to the outlet port 9b; 10b. However, this configuration is shown by way of example only, and the present invention should not be limited thereto. For example, the passageways 9; 10 may also be of essentially same continuous cross section, such as of cylindrical cross section.

The rotor housing 1 is further provided with two flush gas conduits 11 which are suitably connected to a (not shown) flush gas source and arranged at the perimeter of the housing 1 at a location to ensure that in each end position at least one of the flush gas conduits 11 is in communication with the inlet port 9a; 10a of the one passageway 9; 10 that communicates with its outlet port 9b; 10b with the housing outlet 3. The introduction of flush gas via the conduits 11 not only enhances and accelerates the emptying of the passageways 9; 10 but allows also removal of entering hot vapors or other reaction products from the respective passageway 9; 10 to thereby eliminate a material aggregation in the passageways 9; 10.

It will be appreciated by persons skilled in the art that instead of flush gas, a reaction gas may be also be used and fed through the conduits 11 for further processing of the introduced material, with the reaction gas then serving at the same time as a flush gas for the passageways 9, 10.

The rotor housing 1 also includes a pair of vent conduits 12 which, in the intermediate position shown in FIG. 3 communicate with the inlet ports 9a; 10a of the passageways 9; 10 to allow release of pressure within these passageways 9, 10. A build up of pressure occurs e.g. when material is introduced under pressure while being discharged at pressureless state.

At its inside wall 13 which faces the rotor 4, the rotor housing 1 is provided with a plurality of circumferential seals 14 which bear upon the perimeter 15 of the rotor 4 to seal the passageways 9, 10 against the interior space of the housing 1 and to seal the housing inlet 2 and the housing outlet 3 against the rotor 4. Thus, a superior sealing of the rotary feeder is attained. Suitably, the seals 14 may be made of soft or metallic material.

At opposite sides of the inlet 2 and the outlet 3, the housing 1 is further provided with stripper blades 16 which bear upon the perimeter 15 of the rotor 4. By means of these stripper blades 16, the perimeter 15 of the rotor 4 is kept clean in the area of the housing inlet 2 and housing outlet 3. Further, the housing 1 carries at both sides of the housing inlet 2 solid material breakers 17 by which material lumps are crushed which may otherwise interfere in the area of the inlet ports 9a, 10a with the rotation of the rotor 4.

Introduction or dosage of the amount of material into the passageways 9, 10 can be regulated through control of the oscillation frequency of the pivot drive 6. The attainable quantity of material being introduced is determined by the volume and number of the passageways 9, 10 as well as by the dimensions of the rotor 4. For example, several passageways or several groups of passageways may be arranged in succession in axial direction.

Suitably, the rotary feeder may be made of a material or lined with a material which is best suited for the bulk material or liquids being introduced.

It will be appreciated by persons skilled in the art that the rotary feeder may contain much apparatus which does not appear in the foregoing Figures for sake of simplicity. For example, the rotary feeder may be provided with flanges for suitable attachment. Also, the rotary feeder may be provided with a heating or cooling unit to keep the bulk material or liquids at a proper temperature. A heating or cooling may also be attained via a temperature transfer into the passageways from the container or reactor with which the rotary feeder cooperates.

While the invention has been illustrated and described as embodied in a rotary feeder for bulk material or liquids, it is not intended to be limited to the details shown since various modifications and structural changes may be made without departing in any way from the spirit of the present invention.

What is claimed as new and desired to be protected by Letters Patent is set forth in the appended claims:

1. A rotary feeder for bulk material or liquids, comprising:
    an essentially hollow cylindrical housing having a housing inlet and a housing outlet;
    an essentially cylindrical rotor sealingly and rotatably supported in said housing and including two chordal passageways located eccentrically and on opposite sides of the rotational axis of said rotor and extending substantially in a parallel relationship and alternately connectable with said housing inlet and said housing outlet so that in one end position of said rotor one of said passageways communicates with said housing inlet and the other one of said passageways communicates with said housing outlet while in another end position said one passageway communicates with said housing outlet and said other passageway communicates with said housing inlet; and a pivot drive operatively connected to said rotor for shifting said rotor between said end positions.

2. The rotary feeder defined in claim 1 wherein each said passageway has essentially a same continuous cross section.

3. The rotary feeder defined in claim 1 wherein each said passageway is of cylindrical cross section.

4. The rotary feeder defined in claim 1 wherein each said passageway has a cross section expanding from said inlet port to said outlet port.

5. The rotary feeder defined in claim 4 wherein each said passageway has a cross section in form of a truncated cone.

6. The rotary feeder defined in claim 4 wherein each said passageway has a cross section in form of a truncated pyramid.

7. The rotary feeder defined in claim 1 wherein said rotor occupies between said end positions an intermediate position in which neither of said passageways communicates with said housing inlet and housing outlet.

8. The rotary feeder defined in claim 7, and further comprising vent conduit means fitted in said housing and communicating with said passageways in said intermediate position.

9. The rotary feeder defined in claim 1, and further comprising flush gas conduit means fitted in said housing and supplied from a gas source, said flush gas conduit means communicating with said passageways when said passageways communicate with said housing outlet.

10. The rotary feeder defined in claim 1, and further comprising a stripper blade arranged at both sides of said housing inlet and said housing outlet and bearing upon the perimeter of said rotor.

11. The rotary feeder defined in claim 1 wherein said housing inlet and said housing outlet radially oppose each other in a plane through said rotational axis.

* * * * *